(12) United States Patent
Garchar (10) Patent No.: US 8,844,996 B2
(45) Date of Patent: Sep. 30, 2014

(54) EXTENDABLE BED ASSEMBLY FOR A VEHICLE

(75) Inventor: Stephen John Garchar, Redford Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 85 days.

(21) Appl. No.: 13/603,445

(22) Filed: Sep. 5, 2012

(65) Prior Publication Data

US 2014/0062128 A1 Mar. 6, 2014

(51) Int. Cl.
*B62D 33/03* (2006.01)

(52) U.S. Cl.
USPC ........................................ 296/26.09; 296/57.1

(58) Field of Classification Search
CPC .............................. B60R 9/045; B62D 33/0273
USPC ............... 296/26.08, 26.09, 37.6, 57.1, 183.1
See application file for complete search history.

(56) References Cited

U.S. PATENT DOCUMENTS

| | | | | |
|---|---|---|---|---|
| 6,279,980 B1 * | 8/2001 | Straschewski | ............... | 296/57.1 |
| 6,367,858 B1 * | 4/2002 | Bradford | .................... | 296/26.09 |
| 6,991,277 B1 * | 1/2006 | Esler | ................. | 296/50 |
| 7,125,062 B2 * | 10/2006 | Kiester et al. | ................ | 296/37.6 |
| 7,413,231 B1 * | 8/2008 | Wood et al. | ................ | 296/26.11 |
| 7,628,439 B1 * | 12/2009 | Strong | ........................ | 296/26.03 |
| 2003/0141733 A1 * | 7/2003 | Burg | ........................ | 296/26.09 |
| 2006/0208519 A1 * | 9/2006 | King | ............................ | 296/57.1 |
| 2007/0024076 A1 * | 2/2007 | Kiester et al. | ................ | 296/37.6 |
| 2007/0236035 A1 * | 10/2007 | Waldner | ..................... | 296/26.11 |
| 2009/0273202 A1 * | 11/2009 | Heaman et al. | ............... | 296/26.1 |
| 2009/0284036 A1 * | 11/2009 | Clayton | ..................... | 296/26.09 |
| 2011/0260485 A1 * | 10/2011 | Vertanen | .................... | 296/26.08 |
| 2013/0049395 A1 * | 2/2013 | Poirier | ........................ | 296/37.6 |

\* cited by examiner

*Primary Examiner* — Jason S Morrow
(74) *Attorney, Agent, or Firm* — Joseph E. Root (57) ABSTRACT

A vehicle having an extendable bed assembly includes a loading bed and a tailgate pivotally connected to, and positioned upright over the loading bed. A sliding member is retained within the tailgate. To extend the bed assembly, the tailgate is laid down, and the sliding member is extended out rearwards from the tailgate, by unlocking the locking mechanism. The tailgate and the sliding member append the loading bed, to form primary and secondary extensions, respectively, constituting a fully extended bed. A bed grille is slid to the rearmost portion of the extended bed, and fixedly positioned there. The bed grille includes a central member, and a left flap and a right flap pivotally connected to it. The flaps are rotated outwards, to an orientation perpendicular to the central member, forming a U-shaped structure, which acts as a support for the items loaded over the extended portion of the bed assembly.

21 Claims, 6 Drawing Sheets

EXTENDABLE BED ASSEMBLY FOR A VEHICLE

TECHNICAL FIELD

The present disclosure generally relates to vehicles for loading and transporting items, and, more specifically, to loading bed assemblies for vehicles used for loading and transporting items.

BACKGROUND

Pick-up trucks of different sizes are used to transport goods and merchandise from one place to another. The cargo bed size of these pick-up trucks varies, depending on whether the truck is a compact pick-up truck, a mid-size pick-up truck, or a full-size pick-up truck. For example, a mid-sized pick-up truck generally has a capacity to carry plywood or drywall having dimensions of about 4/×8/flat over its cargo bed. Full-size pick-up trucks have an even higher capacity, and are capable of hauling loads within a range of about 1000 lb.-6000 lb.

At times, depending on cost constraints and ease of driving, mid-size pick-up trucks are preferred over full-size pick-up trucks. However, there are certain space limitations due to the comparatively smaller loading bed size of many pick-up trucks, and the amount of load that can be transported through these vehicles is often limited. For example, among the full-size pick-up trucks of the F-series developed by the Ford Motor Company, F-150 is a widely used variant. This vehicle has a cargo bed length of about 5½/. On such a truck-bed, incorporating a plywood piece with a standard size of about 4/×8/ is difficult. A portion of the plywood piece hovers beyond the rear portion of the truck bed, when loaded within the vehicle. Further, another problem is when small items are placed in the truck bed, the items will move around the truck bed while driving, and often shift towards the front portion of the truck bed, as the vehicle moves. During the unloading of the material, a person may need to belly surf from the rear of the bed to the front of the bed, to retrieve the items. This problem becomes even more persistent in the case of pick-up trucks of larger size, as the truck bed is too long to retrieve the items from its innermost portion behind the front cabin.

Considering the aforementioned problems, a need exists for a vehicle for loading and transporting items, whose loading bed may be adjustable, to incorporate loads of larger size. Further, the loading bed should also address the problem of retrieving loaded items that generally shift towards the interior portions of the bed, towards the front cabin, when the vehicle is in motion.

SUMMARY

The present disclosure describes a vehicle having an adjustable loading bed, for transporting items loaded within the vehicle. The loading bed can be extended beyond its normal size, depending on the size of the items to be loaded. Further, the extended bed prevents the loaded materials from sliding towards the front portion of the bed, and hence, alleviates the conventional problem of removing loaded items that generally shift towards the front portion of the loading bed, when the vehicle is in motion.

In an aspect, the present disclosure provides a vehicle having an extendable bed assembly for supporting items loaded within the vehicle. The bed assembly includes a loading bed having a left side bed rail and a right side bed rail. A primary tailgate is positioned over a rear portion of the loading bed, to provide rear support to the items loaded within the bed. The primary tailgate is pivotally connected to the loading bed and orients in an upright position with respect to the bed in the normal unextended position of the bed assembly. In the extended position of the bed assembly, the primary tailgate is in a horizontal laid position with respect to the loading bed, and forms a primary extension for the loading bed. An opening is provided within a top portion of the primary tailgate. The opening leads into a cavity where a sliding member is inserted. In the unextended position of the bed assembly, the sliding member resides substantially inside the cavity within the primary tailgate, and is locked there through a locking mechanism. In the extended position of the bed assembly, the sliding member extends out of the primary tailgate, and appends it to form a secondary extension. An adjustable bed grille is movable along the bed assembly between a front portion of the loading bed, and the rearmost portion of the secondary extension formed by the sliding member. The bed grille includes a central upright member that slides along the loading bed, and a left and a right flap pivotally connected to the central member. In the extended position of the bed assembly, the bed grille is at the rearmost end of the secondary extension, and acts as a rear and side support for the loaded items. In this position, the left and the right flaps of the bed grille rotate outwards with respect to the central member, to an orientation perpendicular to the central member, to form a U-shaped structure of the bed grille.

The extendable bed assembly easily incorporates items of size larger than the original bed size, provides an additional space for incorporating more items, and hence, increases the loading capacity of the vehicle. Further, the bed assembly prevents the items loaded within the rear portion, from sliding towards the front portion of the loading bed, when the vehicle is moving, and hence, eliminates the problem of retrieving loads from the inner portion of the loading bed.

Additional aspects, advantages, features and objects of the present disclosure would be made apparent from the drawings and the detailed description of the illustrative embodiments construed in conjunction with the appended claims that follow.

DETAILED DESCRIPTION OF ILLUSTRATIVE EMBODIMENTS

The following detailed description illustrates aspects of the disclosure and the ways it can be implemented. However, the description does not define or limit the invention, such definition or limitation being solely contained in the claims appended thereto. Although the best mode of carrying out the invention has been disclosed, those in the art would recognize that other embodiments for carrying out or practicing the invention are also possible.

Loading beds of different sizes are provided within pick-up trucks, for transporting small and large size loads. The loading bed size, and hence, the loading capacity of pick-up trucks, may vary depending upon the type of pick-up truck. Very often, due to cost constraints, many people prefer mid-size pick-up trucks over the large size pick-up trucks; however, there is a limitation on the size and weight of items that can be loaded on these trucks. Therefore, it is desirable to have a truck of adjustable bed size, so that if any of the items loaded within the truck have extra dimensions, the adjustable bed size will let such items extend beyond the rear portion of the truck bed.

The present disclosure provides a vehicle having an extendable bed assembly that can extend the loading bed of the vehicle to two extension levels beyond the normal loading bed size, in order to accommodate larger items. In the extended position, the bed assembly also includes a back and a rear support for the loaded items, to prevent the items from falling off. Further, the bed assembly prevents the loaded items from sliding towards the front portion of the loading bed when the vehicle is in motion. This eliminates the conventional problems faced when unloading the items.

Figure 1:
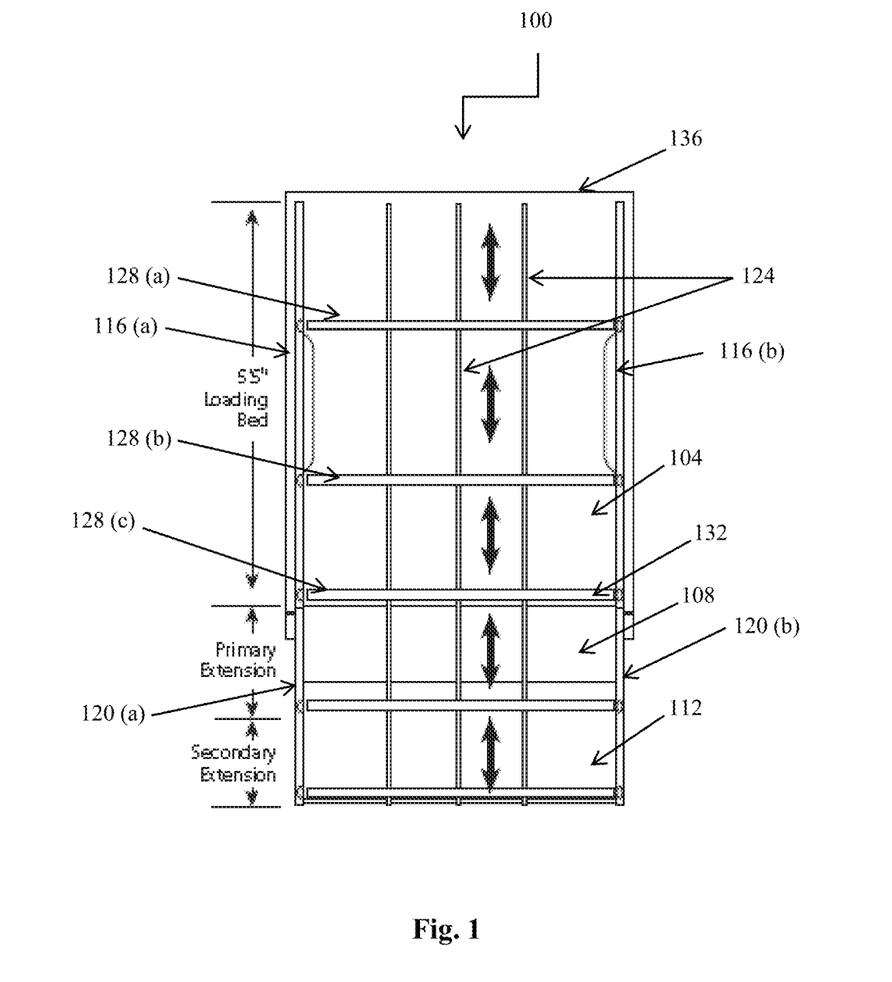
FIG. 1 shows a top view of an extendable bed assembly for a vehicle, in accordance with the present disclosure.

FIG. 1 shows a top view of the extendable bed assembly 100 of the present disclosure, in a fully extended position. The bed assembly 100 includes a loading bed 104 having a left side bed rail 116(a) and a right side bed rail 116(b). A pair of side support walls stands upright over the bed rails 116(a) and 116(b), to provide support for items loaded over the bed 104, thus, preventing the items from falling down. A primary tailgate 108 is pivotally connected to the loading bed 104 at a rear end mark 132. In the shown orientation, the primary tailgate 108 is in a horizontal laid position and appends the loading bed 104, lying substantially coplanar with the loading bed 104. However, in the unextended position of the bed assembly, the primary tailgate 108 stands erect, in the upright position, over the rear end mark 132, and acts as a rear support for the items loaded on the bed 104. To pivotally connect the primary tailgate to the loading bed 104, a hinge mechanism is used, that connects the edges of the primary tailgate 108 to the side support walls of the loading bed 104. Further, the base of the primary tailgate is also pivotally connected to the loading bed 104. The hinge mechanism (not shown) constrains the movement of the primary tailgate 108, and facilitates its rotation between the upright position and the shown horizontal laid position, which will be explained in further details hereinafter. More clearly, in the current view, the primary tailgate 108 is in the horizontally laid position, where it appends the loading bed 104 to form a primary extension for the loading bed 104. To bring the primary tailgate to the shown position, it is rotated through the hinge mechanism, and brought down from its upright position. The rotation can be performed manually, or it can also be actuated automatically through an electronically activated mechanism.

A sliding member 112 appends the primary tailgate 108 in the shown extended position of the bed assembly. Specifically, the sliding member 112 extends beyond the primary extension formed by the primary tailgate 108, and forms a secondary extension appending the primary extension.

In the normal unextended position of the bed assembly, when the primary tailgate 108 stands vertical in the upright position, with respect to the loading bed 104, over the rear end mark 132, the sliding member 112 remains totally within the primary tailgate 108. To facilitate this, an opening is provided within a top portion of the primary tailgate 108, which leads into a cavity where the sliding member 112 resides, and is locked therein through a locking mechanism (not shown). This will be explained in more details in conjunction with the other figures that follow.

Collectively, to bring the bed assembly to the shown extended position, the primary tailgate 108 is laid down, and a latching mechanism unlatches the sliding member 112 residing within the primary tailgate 108, to extend it rearwards, beyond the primary tailgate 108.

In a preferred embodiment, the primary extension appends the loading bed 104 with another 24 inches rearwards, and the secondary extension extends to about 20 inches more, beyond the primary extension. In this manner, an additional bed length of about 44 inches is achieved over the normal loading bed size of 5 feet and 5 inches, making about a 9 feet size of the extended loading bed assembly altogether. However, these dimensions can be varied in certain embodiments, and hence, are not intended to limit the scope of the present disclosure.

An adjustable bed grille 140 is provided and positioned over the bed assembly, which acts as a side and rear support for the items loaded over the extended portion of the loading bed. The adjustable bed grille is capable of sliding over the loading bed 104 and the primary and secondary extensions. When the bed assembly 100 is unextended, the bed grille can be slid and positioned anywhere over the loading bed 104, between the rear end mark 132, and the front end 136 just behind the front cabin of the vehicle. Further, during sliding over the loading bed 104, the adjustable bed grille can be fixedly positioned over any of the shown horizontal marks 128(a), (b) and (c), which will be explained in further details hereinafter. Being engaged with any of these horizontal marks, the bed grille prevents the items loaded over the bed 104, from sliding into the interior portion of the loading bed 104, beyond that mark.

Figure 2:
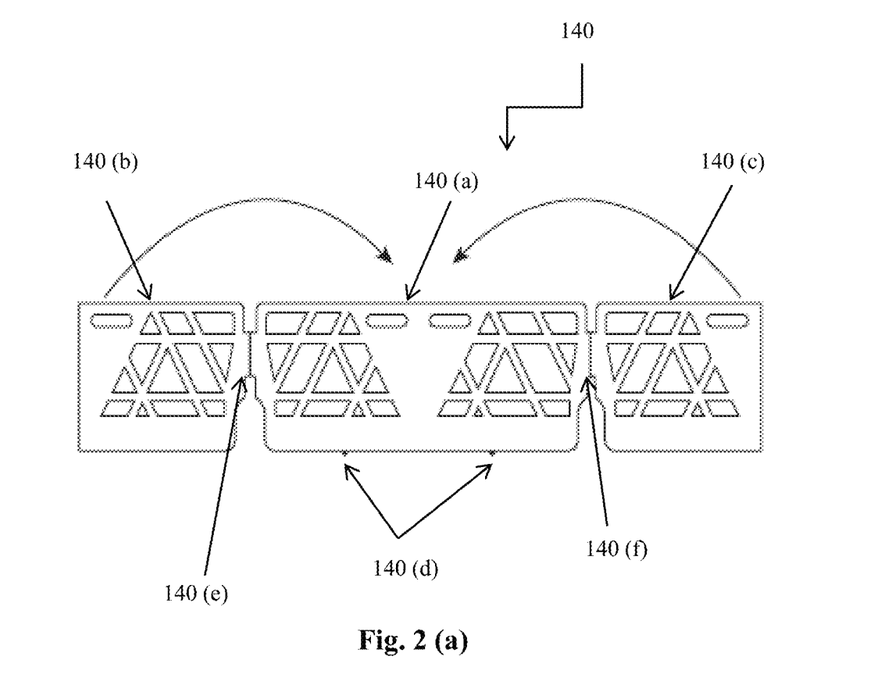
FIG. 2(a) shows a front view of an adjustable bed grille in an unfolded position, mountable over, and being an integral part of, the extendable bed assembly of the present disclosure.
FIG. 2(b) shows a front view of the adjustable bed grille in the folded position.

FIG. 2(a) shows a front view of the adjustable bed grille 140, mountable over the bed assembly. The bed grille 140 includes a central member 140(a) that slides over the loading bed 104. A set of spring-activated rollers (not shown) are attached to the bottom portion of the central member 140(a), at multiple locations 140(d), to facilitate sliding of the central member 140(a) over the loading bed. The rollers engage with bed liners within the loading bed, to facilitate sliding movement of the central member 140(a).

A left flap 140(b) and a right flap 140(c) are pivotally connected to a left edge 140(e) and a right edge 140(f) of the central member 140(a). A slot may be provided within the left and right edges of the central member 140(a), which may align with slots within edges of the flaps, and a screw nut assembly engaging the aligning slots may be used to facilitate pivotal connection of the flaps to the central member 140(a). For example, linearly aligning slots within the left edge 140(e) of the central member 140(a), and the adjoining right edge of the left flap 140(b) may receive a screw, which may be fastened to a nut to pivotally connect the left flap 140(b) to the central member 140(a). However, other conventional means to pivotally connect the flaps to the central member 140(a) may also be used.

The left and right flaps 140(b) and 140(c) are capable of rotating inwards, towards the central member 140(a), fold and orient in front of, and parallel to the orientation of, the central member 140(a). Specifically, when the bed assembly is unextended, the left and right flaps remain folded 1800 inside, with respect to the shown position, to form a single piece. A locking mechanism (though not shown) keeps the flaps secured in that position.

When the bed assembly is fully extended, the bed grille 140 is slid rearwards and positioned at the rearmost end of the extended bed. The folded left and right flaps are rotated 900 outwards (in a sense anti-clockwise, as seen from the top), away from the central member 140(a), and form a left side support, and a right side support, respectively, for the items loaded on the extended part of the bed assembly. Specifically, these flaps align with the sidewalls of the loading bed, to form consolidated side structures. A manual or an automatic rotation of the left and the right flaps 140(b) and (c), is within the scope of this disclosure. In a case where the rotation is automatic, a conventional activating mechanism can facilitate it. The central member 140(a) has a width traced between the side edges 140(e) and 140(f), substantially equal to the width of the loading bed, and hence, it provides full rear support for the loaded items.

FIG. 2(b) shows a front view of the adjustable bed grille 140 in the folded configuration, when it resides anywhere between the front portion of the loading bed and the primary tailgate, in the unextended position of the bed assembly. The left and the right flaps 140(b) and (c) are folded inwards with respect to the central member 140(a), and are hidden in the shown view.

A set of spring-activated rollers 140(g) are attached to the bottom portion of the central member. The rollers 140(g) engage with the truck bed liners, and allow registration of the bed grille 140 therein. The bed liners have grooves/depressions provided within them, at equidistant locations. When the bed grille 140 is slid over the loading bed, the spring force presses the rollers presses against the grooves, and fixedly positions the bed grille 140 over the grooves. In this manner, the bed grille can be fixedly positioned at any specific position over the loading bed, where the grooves within one bed liner align linearly with the grooves within the other bed liners, to define the position. Therefore, when residing within the interior of the loading bed, the bed grille is used as a wall for the loaded items, and it prevents them from sliding towards the front portion of the loading bed. This facilitates easy retrieval of the loaded items. The spring-activated mechanism for the bottom rollers 140(g) will be explained in further details in conjunction with a subsequent figure.

A set of side rollers 140(h) are attached to the left edge and the right edge of the central member 140(a). The side rollers 140(h) engage with guiding channels within the side support walls of the bed assembly, as the bed grille slides. Specifically, the side support walls, positioned over the side rails of the loading bed, have a pair of primary guiding channels each, whereon the side roller 140(h) roll, facilitating movement of the bed grille 140 till the rear end of the loading bed. Further, secondary guiding channels reside within the primary guiding channels, and are extended out rearwards, appending the primary guiding channels. Beyond the rear end of the loading bed, the side rollers 140(h) engage with the secondary guiding channels and are guided through those channels, to facilitate movement of the bed grille 140 along the primary and secondary extensions of the bed assembly.

Figure 3:
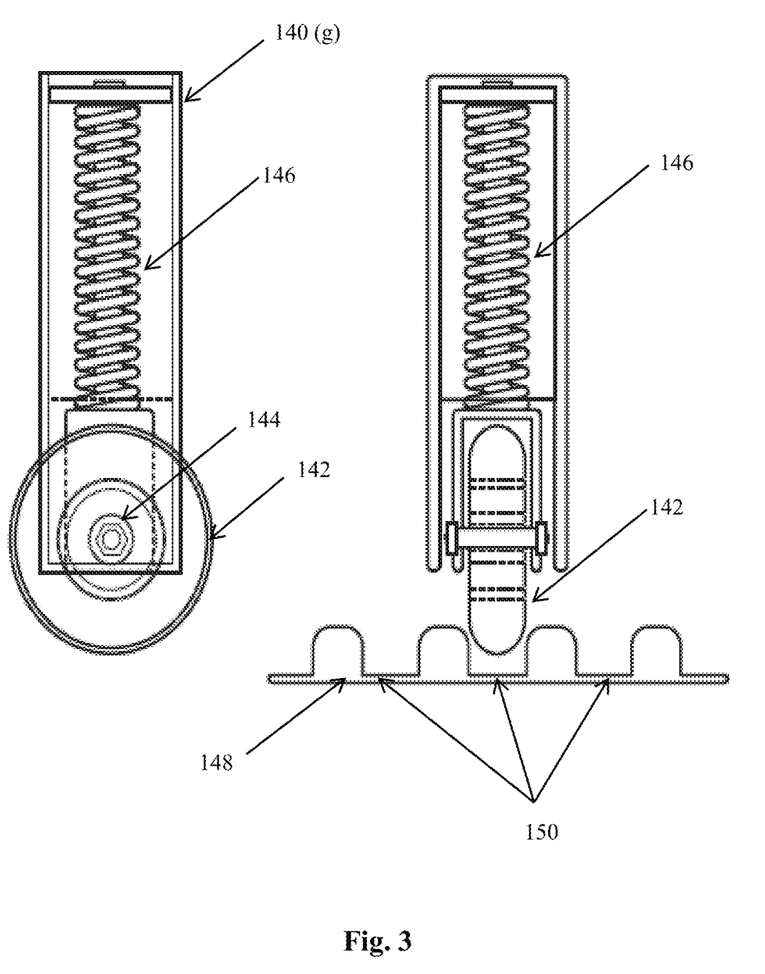
FIG. 3 shows a side view and a front view of spring-activated rollers attached to a bottom portion of the bed grille of FIG. 2(a), to facilitate sliding movement of the bed grille over the bed assembly of the present disclosure.

FIG. 3 shows the spring-activated rollers 140(g) of FIG. 2(b), attached to the bottom portion of the central member of the adjustable bed grille. The figure on the left side is a side view of the rollers 140(g). As shown, the roller 140(g) includes a rolling wheel 142 attached to its bottom through a screw-nut assembly 144. A spring 146 pushes against the rolling wheel 142, to allow registration of the roller 140(g) within the truck bed liners.

The figure on the right shows a side view of the roller 140(g), engaging with one of the truck bed liners 150. The surface 148 of the loading bed includes multiple bed liners 150 provided parallel to each other, and extending all along the length of the loading bed. The rolling wheel 142 engages with one of these bed liners. Similarly, other such rolling wheels 142 attached to the bottom of the central member of the bed grille, engage with other bed liners. Further, as aforementioned, each bed liner 150 has multiple grooves (depressions) provided within it at equidistant locations. While rolling within the bed liners 150, as the wheel 142 moves into any of these grooves, the spring 146 presses the wheel downwards, to allow its registration into the groove. Similarly, other wheels attached to bed grille, get registered into other grooves within adjacent parallel bed liners. When all the rolling wheels are registered into different grooves, the bed grille is fixedly positioned at a specific position on the loading bed. In this manner, the bed grille acts as a barrier for loaded items from shifting into the interior of the loading bed, towards the front cabin, beyond that specific position.

Different grooves can be provided linearly aligned with each other, within the different bed liners, to define any number of levels, and the bed grille can be fixedly positioned at any of those levels.

Figure 4:
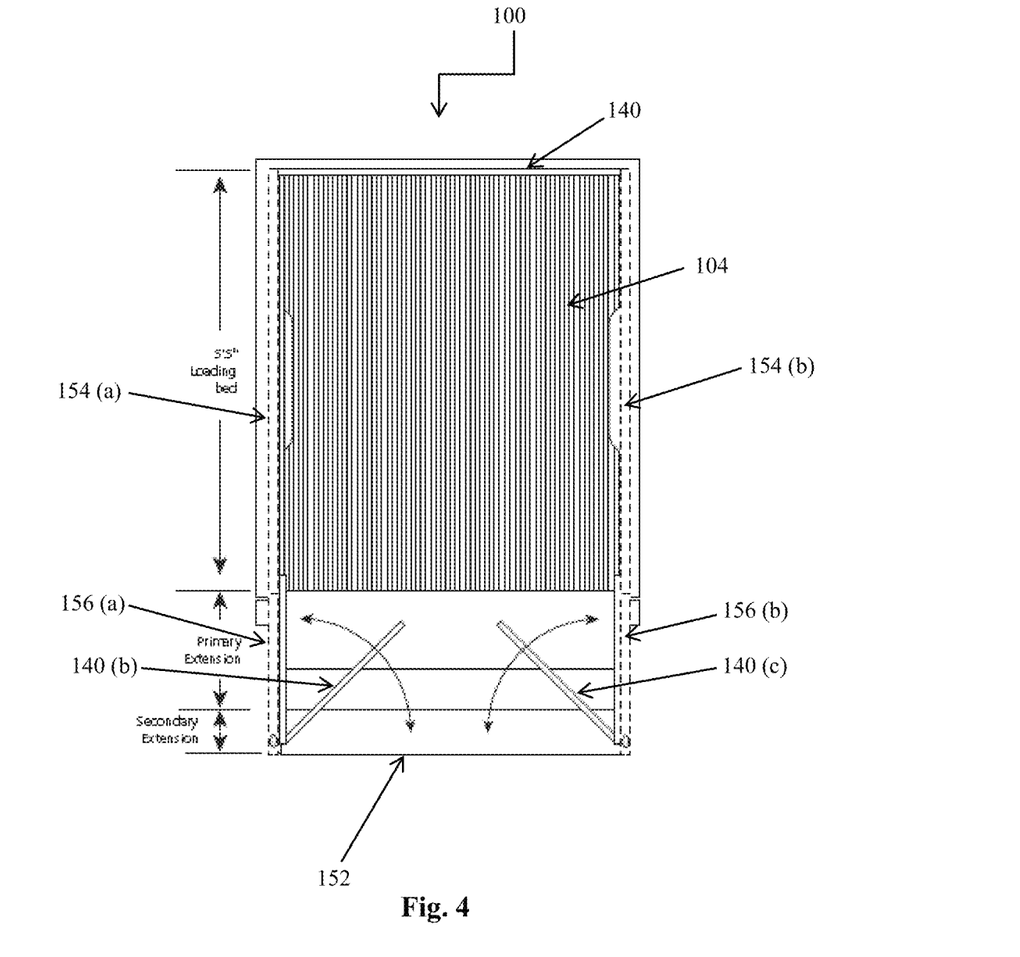
FIG. 4 is a top view of the bed assembly of the present disclosure, in the extended position, illustrating the extreme mountable positions for the bed grille thereon.

FIG. 4 shows a top view of the bed assembly 100 of the present disclosure, illustrating the extreme mounting positions for the bed grille 140. One extreme position for the bed grille 140 is the frontmost portion of the loading bed 104, behind the front cabin, where it is shown completely folded. As mentioned earlier, the left and right flaps of the bed grille are rotated inwards, and remain folded in this position. In the unextended position of the bed assembly, the bed grille 140 can be slid and positioned anywhere on the loading bed 104, between the frontmost end and the rear end mark 132 where the primary tailgate stands upright. Effectively, when the bed assembly is unextended, the bed grille 140 acts as a partitioning member that divides the region for loading items, constituted by the primary tailgate and the left and right support walls of the loading bed 104, into two separate compartments. The two compartments can be resized by moving the bed grille 140 along the loading bed 104. Further, being fixedly positioned at any location between the rear end 132 and the front portion of the loading bed 104, the bed grille 140 also prevents the items loaded within one compartment from shifting into the other compartment, when the vehicle is in motion.

In the fully extended position, where the primary tailgate and the sliding member are laid horizontally and append to the loading bed 104 to form the primary and secondary extensions, the bed grille 140 is slid all the way to the rearmost mark 152 of the secondary extension. The spring rollers attached to the bottom portion of the central member 140(a) of the bed grille 140, get registered into the grooves provided linearly at the mark 152, and fixedly position the central member 140(a) there. After that, the left and right flaps 140(b) and 140(c), are rotated 900 outwards, with respect to the central member 140(a), in the sense shown by the two arrows, to form a left side support and a right side support, respectively, for the extended portion of the bed assembly. As aforementioned, the flaps can be either manually rotated outwards, or an electronically activating mechanism can be used to facilitate their automatic rotation. Effectively, when rotated this way, the left and right flaps align with the left side support wall and the right side support wall of the loading bed, to form consolidated left and right support structures for the loaded items. Further, to prevent retracting of the flaps back to the folded position, a restraining means is used that keeps these flaps engaged and aligned with the side support walls.

A pair of primary guiding channels 154(a) and 154(b) is provided within the left side support wall and the right side support walls of the loading bed, respectively. Further secondary guiding channels 156(a) and 156(b) are shown extending out rearwards from the primary guiding channels 154(a) and 154(b). In the unextended position, the secondary guiding channels 156(a) and (b) remain inserted within the primary guiding channels 154(a) and (b). These are ejected out rearwards, as shown, when the bed assembly is in extended position. The length of the secondary guiding channels 156(a) and (b) is substantially equal to the cumulative length of the primary and secondary extensions. Beyond the rear mark 132 the side rollers attached to the central member 140(a) of the bed grille 140, move along the secondary guiding channels to assist further sliding of the bed grille 140, beyond the loading bed 104, over the extended portion.

Figure 5:
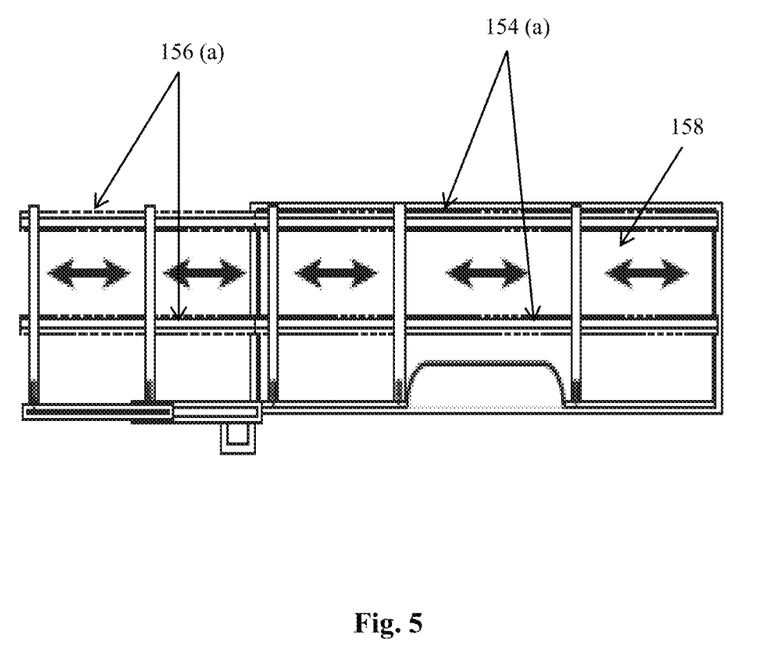
FIG. 5 shows a side view of the bed assembly of the present disclosure, in the extended position.

FIG. 5 is a side view of the bed assembly in the extended position, illustrating the primary and secondary guiding channels more clearly. As shown, the side support wall 158 is provided with primary guiding channels 154(a). The secondary guiding 156(a), currently shown ejected outwards, remain within the primary guiding channels 154(a), when the bed assembly is in unextended position. To facilitate ejection of the secondary guiding channels 156(a) from the primary guiding channels 154(a), any appropriate conventional mechanism may be used. For example, openings may be provided over the outer surface of the secondary guiding channels 156(a), and locking pins may engage with these openings to keep the secondary guiding channels intact within the primary guiding channels. To push the secondary guiding channels outwards, the locking pins can be deactivated. Alternatively, spring-activated retainers may be used to secure the secondary guiding channels within the primary guiding channels.

Figure 6:
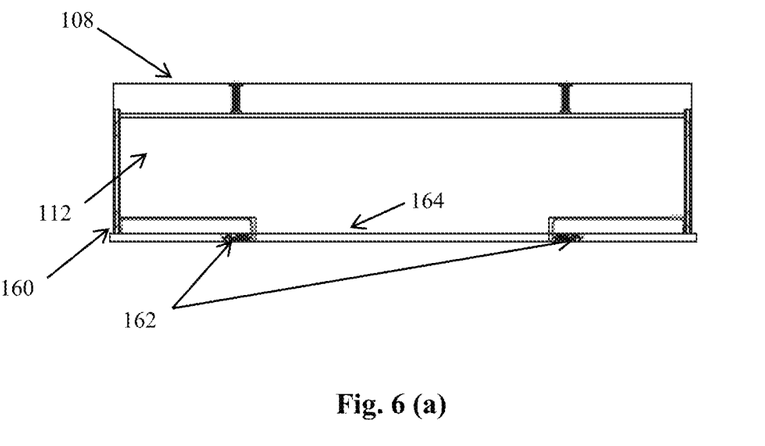
FIG. 6(a) is a top view of the primary tailgate of the bed assembly, in horizontal laid position, with a sliding member residing in a cavity therein, in accordance with the present disclosure.
FIG. 6(b) is a top view of the primary tailgate of the bed assembly, in an orientation positioned upright over the rear end of a loading bed of the bed assembly, with the sliding member residing and locked therein.
FIG. 6(c) is a top view of the primary tailgate, and the sliding member extended out rearwards, and appending the primary tailgate, to form a full extension for the bed assembly, in accordance with the present disclosure.

FIG. 6(a) is a top view of the primary tailgate 108 and the sliding member 112 engaging with it, when the sliding member 112 remains inserted in a cavity within the primary tailgate 108. The view corresponds to the horizontal laid position of the primary tailgate 108 over the loading bed. As shown, the sliding member 112 completely resides within the primary tailgate 108. A locking mechanism 162 keeps the sliding member 112 secured within the primary tailgate 108. In an embodiment, the locking mechanism 162 may include a pair of linearly sliding bars sliding horizontally within a groove along the rear edge of the primary tailgate 108, to prevent the sliding member 112 from coming out. However, any other conventional locking mechanism may also be alternatively used to serve that purpose. Further, spring-activated latches 160 are provided at the corners of the rear edge of the primary tailgate 108, to unlatch the sliding member 112 and facilitate its ejection outwards. Specifically, to extend the sliding member 112 outwards, the locking mechanism 162 is unlocked, and then, the latches 160 push it out. The rear edge 164 of the sliding member 112 acts as a base for supporting the bed grille, when the bed grille is slid to the rearmost position.

Any suitable material, including metals like iron, or any metallic alloy, including high strength low alloy (HSLA) steel, can be used to manufacture the primary tailgate 108 and the sliding member 112. The selection of material may depend on factors like cost constraints and other specific requirements. Though the primary tailgate is shown having a rectangular shape, and the sliding member 112 is T-shaped, they can be formed of any other appropriate compatible shapes too.

FIG. 6(b) is a top view of the primary tailgate 108, in an orientation where it stands upright, vertically over the rear end of the loading bed, with the sliding member 112 residing and locked inside it. To facilitate easy ejection of the sliding member 112, a latch button 166 is provided over the top portion of the primary tailgate 108. The latch button 166 may be a push button, and is coupled to the latches provided at the corners of the primary tailgate 108, as aforementioned. Pushing the latch button 166 unlatches the sliding member 112 and ejects it out.

FIG. 6(c) shows a top view of the primary tailgate 108 in the horizontal laid position, where the sliding member 112 is extended outwards and appends the primary tailgate 108. During being extended outwards, the sliding member 112 lies substantially coplanar with the primary tailgate 108. The amount of secondary extension 'y' achieved due to the sliding member 112, beyond the primary extension 'x' formed by the primary tailgate, is about 3.5 feet. This converts a normal loading bed having a length of about 5.5 feet, to a 9 feet extended bed, thus, significantly increasing the loading capacity of the bed assembly. Further, the size of the sliding member 112 and the primary tailgate 108 can be varied in other embodiments, depending on the requirements, to increasing the loading capacity even further.

The extendable bed assembly of the present disclosure can be used in any pick-up truck, irrespective of its size. Further, the disclosed means and mechanisms used to extend the loading bed and bring the bed assembly in fully extended position, merely correspond to a preferred embodiment, and other alternative means and mechanisms may also be used, thus, not limiting the scope of the disclosure. Also, obvious variations in the size of the different integral components of the extendable bed assembly, including the size and shape of the primary tailgate, the sliding member, and the adjustable bed grille, are well within the scope of the present disclosure.

Although the current invention has been described comprehensively, in considerable details to cover the possible aspects and embodiments, those skilled in the art would recognize that other versions of the invention are also possible.

What is claimed is:

1. An extendable bed assembly for supporting items loaded within a vehicle, the bed assembly comprising:
    a loading bed having a left side bed rail and a right side bed rail;
    a primary tailgate having a lower portion pivotally connected to a rear portion of the loading bed, the primary tailgate being in an upright position with respect to the loading bed during an unextended position of the bed assembly, and being in a laid position with respect to the loading bed, to form a primary extension for the loading bed during an extended position of the bed assembly;
    an opening within a portion of the primary tailgate, leading into a cavity, and a sliding member receivable in the cavity through the opening, wherein:
        in the unextended position of the bed assembly, the sliding member residing substantially inside the cavity and being locked therein through a locking mechanism; and in the extended position of the bed assembly, the sliding member extending out rearwards through the opening, to form a secondary extension for the loading bed, appending the primary extension; and an adjustable bed grille movable along the loading bed between a front portion of the loading bed and a rearmost end of the secondary extension, the adjustable bed grille including:
- a central upright member configured to slide along the loading bed; and
- a left and a right flap pivotally connected to the central member, the left and the right flaps rotating outwards with respect to the central portion, to a configuration perpendicular to the central portion, to form a U-shaped structure, in a position where the adjustable bed grille is at the rearmost end of the secondary extension, the central portion, the left flap and the right flap forming a rear support, a left support and a right support for items loaded within the bed assembly, respectively, in the extended position of the bed assembly; and wherein a left edge and a right edge of the sliding member append to a left edge and a right edge of the primary tailgate during the extended position of the bed assembly, respectively, to form a left side bed rail extension and a right side bed rail extension for the bed assembly.

2. The extendable bed assembly of claim 1, wherein the opening is provided within a top portion of the primary tailgate, and the sliding member is received into, and resides within the opening, during the unextended position of the bed assembly, in a manner that the sliding member stands upright parallel to the orientation of the primary tailgate in the unextended position.

3. The extendable bed assembly of claim 1, wherein the primary tailgate includes a latching mechanism to secure the sliding member within the opening, during the unextended position, and to release the sliding member out rearwards, during the extended position of the bed assembly.

4. The extendable bed assembly of claim 3, wherein the latching mechanism is spring-activated.

5. The extendable bed assembly of claim 1, wherein the left side bed rail extension and the right side bed rail extension substantially align with the left side bed rail and the right side bed rail of the loading bed, respectively, during the extended position of the bed assembly.

6. The extendable bed assembly of claim 5, wherein the loading bed has a left side support member and a right side support member positioned upright over the left side bed rail and the right side bed rail, respectively, the side support members having a pair of primary guiding channels each, to guide the movement of the adjustable bed grille along the loading bed.

7. The extendable bed assembly of claim 6, wherein each of the pair of primary guiding channels has a secondary guiding channel inserted and secured therein, the secondary guiding channels extending out rearwards and aligning with the primary guiding channels during the extended position of the bed assembly, to guide the movement of the adjustable bed grille.

8. The extendable bed assembly of claim 7, wherein the adjustable bed grille includes multiple rollers attached to the left edge and the right edge of the central member thereof, the rollers being configured to roll along the primary and the secondary guiding channels, to facilitate movement of the adjustable bed grille between the front portion of the loading bed and the rearmost edge of the secondary extension.

9. The an extendable bed assembly of claim 8, the loading bed having a plurality of bedliners, wherein a plurality of spring-activated rollers are attached to the bottom part of the central portion of the adjustable bed grille, each spring-activated roller engaging with a bed liner, and facilitating movement of the central portion of the adjustable bed grille over the loading bed.

10. The extendable bed assembly of claim 9, wherein each bed liner has multiple depressions provided therein, and each spring-activated roller is configured to engage a depression within a bed liner, in a manner wherein the engaged rollers lie substantially linearly along the same level, to fixedly position the adjustable grille on the loading bed, at the level.

11. The extendable bed assembly of claim 10, wherein each depression within one bed liner is provided at the same level with respect to a depression within an adjacent bed liner, to form a set of depressions aligning substantially linearly to define the level, and different sets of depressions form different levels, the different levels being configured to retain the adjustable bed grille at those levels.

12. The extendable bed assembly of claim 9, wherein a surface of each of the primary tailgate and the sliding member, is provided with channels, the channels aligning with the bed liners, in the extended position of the bed assembly, to facilitate movement of the spring-activated rollers beyond the bed liners, along the primary extension and the secondary extension.

13. The extendable bed assembly of claim 1, wherein the left and the right flaps of the adjustable bed grille are oriented in a position folded inwards, parallel to the central portion, in the unextended position of the bed assembly.

14. The extendable bed assembly of claim 1, having two support members at the left edge and the right edge of the bed assembly, configured to position the primary tailgate coplanar to the loading bed, when the primary tailgate is in the laid position.

15. The extendable bed assembly of claim 1, the vehicle being a pick-up truck for loading and transporting items.

16. A vehicle comprising:
- a loading bed having a left side bed rail and a right side bed rail;
- a primary tailgate having a lower portion pivotally connected to a rear portion of the loading bed, the primary tailgate being in an upright position with respect to the loading bed during an unextended position of the bed assembly, and being in a laid position with respect to the loading bed, to form a primary extension for the loading bed during an extended position of the bed assembly;
- an opening within a portion of the primary tailgate, leading into a cavity, and a sliding member receivable in the cavity through the opening, wherein:
  - in the unextended position of the bed assembly, the sliding member residing substantially inside the cavity and being locked therein through a locking mechanism; and
  - in the extended position of the bed assembly, the sliding member extending out rearwards through the opening, to form a secondary extension for the loading bed, appending the primary extension; and
- an adjustable bed grille movable along the loading bed between a front portion of the loading bed and a rearmost end of the secondary extension, the adjustable bed grille including:
  - a central upright member configured to slide along the loading bed; and
  - a left and a right flap pivotally connected to the central member, the left and the right flaps rotating outwards with respect to the central portion, to a configuration perpendicular to the central portion, to form a U-shaped structure, in a position where the adjustable bed grille is at the rearmost end of the secondary extension, the central portion, the left flap and the right flap forming a rear support, a left support and a right support for items loaded within the bed assembly, respectively, in the extended position of the bed assembly; and wherein a left edge and a right edge of the sliding member append to a left edge and a right edge of the tailgate during the extended position of the loading bed, respectively, to form a left side bed rail extension and a right side bed rail extension for the loading bed.

17. The vehicle of claim 16, wherein an opening is provided within a top portion of the primary tailgate, the opening leading into the cavity configured to receive the sliding member when the loading bed is in the unextended state, the sliding member being oriented upright parallel to the primary tailgate and securely positioned within the cavity, during residing therein.

18. The vehicle of claim 16, wherein the primary tailgate includes a spring-activated latching mechanism to secure the sliding member within the cavity during the unextended state, and to release the sliding member, facilitating its extension rearwards, away from the primary tailgate, during the extended state of the loading bed.

19. A vehicle comprising:
a loading bed for loading items, having a left side bed rail and a right side bed rail, and a left side wall and a right side wall, positioned upright over the left side bed rail and the right side bed rail of the loading bed, respectively, to form a side support structure for the loading bed, each of the left and the right side walls having a pair of guiding channels provided therein;
a tailgate pivotally connected to, and positioned upright over a rear portion of the loading bed; and
a partitioning member positioned upright over the loading bed, and being configured to slide over the loading bed, between the tailgate and a frontmost portion of the loading bed, the partitioning member dividing the region for loading items, constituted by the loading bed and the side walls, in two compartments, the first compartment being enclosed between the tailgate and the partitioning member, and the second compartment being enclosed between the partitioning member and a front wall erected over the frontmost portion of the loading bed; the loading bed being further configured to prevent items loaded within the first compartment from sliding into the second compartment; and a mechanism for fixing the partitioning member at multiple positions along the loading bed, the mechanism including
multiple rollers attached to a left edge and a right edge of the partitioning member, the rollers being configured to roll along the guiding channels to facilitate movement of the partitioning member along the loading bed;
a plurality of spring-activated rollers attached to a bottom portion of the partitioning member, each spring-activated roller engaging with a bed liner of the loading bed; and
multiple depressions provided within each of the bed liners of the loading bed, the spring activated rollers being configured to engage with a series of depression aligned substantially linearly, to fixedly position the partitioning member.

20. The vehicle of claim 19, wherein each depression with a specific bed liner aligns substantially linearly with a depression each within its adjacent bed liners, the aligned depressions furcating the length of the loading bed into different levels, each level being defined by a set of depressions within different bed lines aligned linearly substantially along the width of the loading bed.

21. The vehicle of claim 20, wherein, during movement of the partitioning member, each of the spring-activated rollers is configured to engage a specific depression within the bed liner that it engages with, in a manner that the depressions that the different spring-activated rollers engage with, are aligned substantially linearly along a specific level, to fixedly position the partitioning member along that level, and to define a pre-determined size of the first and second compartments.

* * * * *